(12) United States Patent
Krishnamurthi et al.

(10) Patent No.: US 9,949,234 B2
(45) Date of Patent: Apr. 17, 2018

(54) ALLOCATION FOR PAGING RECEPTION

(71) Applicant: Telefonaktiebolaget LM Ericsson (publ), Stockholm (SE)

(72) Inventors: Balasubramanian Krishnamurthi, Bangalore (IN); Karthik Ananthanarayanan, Bangalore (IN); Joakim Axmon, Kävlinge (SE); Sajal Kumar Das, Bangalore (IN); Pankaj Jaiswal, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/116,010

(22) PCT Filed: Dec. 17, 2014

(86) PCT No.: PCT/EP2014/078224
§ 371 (c)(1),
(2) Date: Aug. 2, 2016

(87) PCT Pub. No.: WO2015/117709
PCT Pub. Date: Aug. 13, 2015

(65) Prior Publication Data
US 2017/0188332 A1 Jun. 29, 2017

(30) Foreign Application Priority Data
Feb. 5, 2014 (IN) .............................. 341/DEL/2014

(51) Int. Cl.
*H04W 40/00* (2009.01)
*H04W 68/02* (2009.01)
(Continued)

(52) U.S. Cl.
CPC ......... *H04W 68/02* (2013.01); *H04W 68/005* (2013.01); *H04W 88/06* (2013.01)

(58) Field of Classification Search
CPC ... H04W 68/00; H04W 68/02; H04W 68/025; H04W 48/16; H04W 4/06
See application file for complete search history.

(56) References Cited

U.S. PATENT DOCUMENTS

| | | | |
|---|---|---|---|
| 2011/0096706 | A1 | 4/2011 | Ramasamy et al. |
| 2012/0008721 | A1 | 1/2012 | Wippich |

(Continued)

FOREIGN PATENT DOCUMENTS

| | | |
|---|---|---|
| CN | 102523571 A | 6/2012 |
| WO | 2011056254 A1 | 5/2011 |
| WO | 2012106664 A1 | 8/2012 |

OTHER PUBLICATIONS

Author Unknown, "Technical Specification Group Core Network and Terminals; Mobile radio interface Layer 3 specification; Core network protocols; Stage 3 (Release 12)," Technical Specification 24.008, Version 12.11.0, 3GPP Organizational Partners, Sep. 2015, 713 pages.

(Continued)

*Primary Examiner* — Steve D Agosta
(74) *Attorney, Agent, or Firm* — Withrow & Terranova, PLLC (57) ABSTRACT

A method is disclosed of a wireless communication device adapted to communicate using a radio access transceiver alternatingly in accordance with a first radio access technology and in accordance with a second radio access technology. The method comprises allocating a number of time periods during communication in accordance with the first radio access technology to reception of a paging signal of the second radio access technology, wherein the number is dynamically variable based on a result of a (block) decoding of at least one previous paging signal of the second radio access technology. The number may be set based on at least one respective previous number of time periods required for (Continued)

successful (block) decoding of the at least one previous paging signal. Furthermore, the number may be set to a maximum value if an immediately previous paging signal was not successfully decoded.

18 Claims, 3 Drawing Sheets

(51) Int. Cl.
     *H04W 68/00*     (2009.01)
     *H04W 88/06*     (2009.01)

(56) References Cited

U.S. PATENT DOCUMENTS

| | | | |
|---|---|---|---|
| 2013/0035120 A1* | 2/2013 | Dhanda | H04W 68/02 455/458 |
| 2013/0337850 A1 | 12/2013 | Ljung | |
| 2014/0119293 A1 | 5/2014 | Sikri et al. | |
| 2014/0119343 A1 | 5/2014 | Chin et al. | |
| 2014/0247813 A1 | 9/2014 | Henneberg Rysgaard | |

OTHER PUBLICATIONS

Author Unknown, "Technical Specification Group GSM EDGE Radio Access Network; Mobile Station—Base Station System (MS-BSS) interface; Data Link (DL) layer specification (Release 8)," Technical Specification 44.006, Version 8.0.0, 3GPP Organizational Partners, Dec. 2008, 60 pages.

International Search Report and Written Opinion for International Patent Application No. PCT/EP2014/078224, dated Feb. 25, 2015, 12 pages.

* cited by examiner

ALLOCATION FOR PAGING RECEPTION

This application is a 35 U.S.C. § 371 national phase filing of International Application No. PCT/EP2014/078224, filed Dec. 17, 2014, which claims priority to Indian Patent Application No. 341/DEL/2014, filed Feb. 5, 2014, the disclosures of which are incorporated herein by reference in their entireties.

BACKGROUND

Many typical wireless communication devices (e.g. User Equipment—UE or mobile station) use a single radio (RF) transceiver to handle traffic from two or more radio access technologies (RATs; UMTS LTE—Universal Mobile Telecommunications System, Long Term Evolution—and GSM—Global System for Mobile communications—will be used herein as a non-limiting example).

Such devices may use network signaling to determine when to switch from a packet switched (PS) communication (e.g. UMTS LTE) to a circuit switched (CS) communication (e.g. a legacy radio access technology such as GSM). The circuit switched fallback (CSFB) helps the UMTS LTE network to handle a CS call by moving the connection to a legacy RAT, and then moving back to UMTS LTE when the CS call is over.

Due to the Idle state Signaling Reduction (ISR) feature, a device may—while it is connected to the UMTS LTE network—also get a CS paging message from a legacy (CS) network (e.g. GSM, UMTS—Universal Mobile Telecommunication Standard, WCDMA—Wideband Code Division Multiple Access, TD-SCDMA—Time Division Synchronous Code Division Multiple Access, etc.).

So, if the device can read the CS paging messages from the legacy network in parallel to being connected to the UMTS LTE network (possibly with an on-going data call), then the device can quickly do the CS call set up in the legacy network. This will allow the device to be connected to or camp on UMTS LTE cells also in networks where CSFB support has not been rolled out, and also will provide an advantage over CSFB of providing faster CS call set up than CSFB.

To achieve reading of CS paging from the legacy network while being connected in UMTS LTE, a device with a single radio transceiver for these purposes faces a problem since it has only one radio block (transceiver) and that block needs to be shared between UMTS LTE and legacy page monitoring. If UMTS LTE data transfer is on-going, then the reading in parallel of CS paging from the legacy network will affect the data transfer in UMTS LTE (e.g. some packet throughput loss may happen).

This is scenario is especially cumbersome for a scenario where an UMTS LTE (TDD—Time Division Duplex) data call is on-going while the device needs to monitor paging from the GSM network.

There is a need for methods and arrangements for a single radio transceiver device that provide efficient allocation of the transceiver for paging reception in one network during communication in another network.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods and arrangements for a single radio transceiver device that provide efficient allocation of the transceiver for paging reception in one network during communication in another network.

Preferably, the loss of throughput of the other network (e.g. UMTS LTE) is as low as possible (or at least decreased compared to the prior art) according to some embodiments.

One aim is to minimize the UMTS LTE throughput loss caused by monitoring the paging message from legacy network (e.g. GSM).

A first aspect is a method of a wireless communication device adapted to communicate using a radio access transceiver alternatingly in accordance with a first radio access technology and in accordance with a second radio access technology. The method comprises allocating a number of time periods during communication in accordance with the first radio access technology to reception of a paging signal of the second radio access technology, wherein the number is dynamically variable based on a result of a (e.g. block) decoding of at least one previous paging signal of the second radio access technology.

Allocating a number of time periods for (or to) reception of a paging signal of the second radio access technology may comprise causing the radio access transceiver to receive the paging signal of the second radio access technology during the number of time periods.

In some embodiments, the communication (reception and/or transmission) in accordance with the first radio access technology is interrupted during the number of time periods.

The number may be an integer value between one and a maximum value. The maximum value may be a maximum total number of bursts of a paging signal according to the second radio access technology.

According to some embodiments, the method may further comprise receiving the paging signal of the second radio access technology during the allocated number of time periods, decoding the received paging signal, and setting a subsequent number for allocation to reception of a subsequent paging signal based on a result of the decoding of the received paging signal.

In some embodiments, the method may further comprise allocating the subsequent number of time periods during communication in accordance with the first radio access technology to reception of the subsequent paging signal of the second radio access technology, receiving the subsequent paging signal of the second radio access technology during the allocated subsequent number of time periods, decoding the received subsequent paging signal, and setting a yet subsequent number for allocation to reception of a yet subsequent paging signal based on a result of the decoding of the received subsequent paging signal.

The number for allocation to reception of the paging signal may, according to some embodiments, be set based on at least one respective previous number of time periods required for successful decoding of the at least one previous paging signal. For example, the number may be set to equal a previous number of time periods required for successful decoding of a previous paging signal (or a filtered version thereof).

In some embodiments, the number for allocation to reception of the paging signal may be set to an output value of a filter having the at least one respective previous number of time periods as an input. One or more coefficients of the filter may, for example, be based on one or more of a received signal strength of the at least one previous paging signal and a channel type applicable during reception of the at least one previous paging signal.

The first radio access technology may be a radio access technology in accordance with the Universal Mobile Telecommunication Standard, Long Term Evolution—UMTS LTE—and the second radio access technology may be a radio access technology in accordance with the Global System for Mobile communications—GSM. Each time period may correspond to a time period required to receive a burst of a GSM paging block.

The number may be an integer value between one and four (the maximum number for GSM). In some embodiments, the method may further comprise initiating the number to four. According to some embodiments, the method may further comprise setting the number to four if an immediately previous paging signal was not successfully decoded.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

A third aspect is an arrangement for a wireless communication device adapted to communicate using a radio access transceiver alternatingly in accordance with a first radio access technology and in accordance with a second radio access technology. The arrangement comprises a controller adapted to cause execution of method steps according to the first aspect. In some embodiments, the arrangement may further comprise the radio access transceiver and/or a memory adapted to store the number for allocation of reception of the paging signal.

A fourth aspect is an arrangement for a wireless communication device adapted to communicate using a radio access transceiver alternatingly in accordance with a first radio access technology and in accordance with a second radio access technology. The arrangement comprises a radio scheduler adapted to allocate a number of time periods during communication in accordance with the first radio access technology to reception of a paging signal of the second radio access technology, wherein the number is dynamically variable based on a result of a decoding of at least one previous paging signal of the second radio access technology.

In some embodiments, the arrangement may further comprise the radio access transceiver adapted to receive the paging signal of the second radio access technology during the allocated number of time periods, a decoder adapted to decode the received paging signal, and a number setting unit adapted to set a subsequent number for allocation to reception of a subsequent paging signal based on a result of the decoding of the received paging signal.

The radio scheduler may be further adapted to allocate the subsequent number of time periods during communication in accordance with the first radio access technology to reception of the subsequent paging signal of the second radio access technology, the radio transceiver may be further adapted to receive the subsequent paging signal of the second radio access technology during the allocated subsequent number of time periods, the decoder may be further adapted to decode the received subsequent paging signal, and the number setting unit may be further adapted to set a yet subsequent number for allocation to reception of a yet subsequent paging signal based on a result of the decoding of the received subsequent paging signal according to some embodiments.

In some embodiments, the fourth aspect may additionally have features identical with or corresponding to any of the various features as explained above for the first aspect and/or the third aspect.

A fifth aspect is a wireless communication device comprising the arrangement according to any of the third and fourth aspects.

An advantage of some embodiments is that reception of a paging signal of a second radio access technology by a single radio transceiver device is enabled during communication of a first radio access technology.

Another advantage of some embodiments is that an adverse effect on the throughput of the communication of the first radio access technology, caused by the reception of the paging signal of the second radio access technology, may be minimized, mitigated, or at least reduced.

Example advantages of some embodiments include:

The solution according to some embodiments enables reading CS paging (in parallel) while UMTS LTE is connected.

The solution according to some embodiments enables quick CS call set up.

The solution according to some embodiments enables avoidance of CSFB in a single radio terminal.

The solution according to some embodiments proposes a method to dynamically predict the number of Common Control CHannel (CCCH)) and Broadcast Control CHannel (BCCH) bursts or specifically the number of Paging Channel (PCH) bursts (part of the CCCH) and the BCCH bursts it is required to receive for successful decoding. Based on that, the remaining time can be used for UMTS LTE data transfer. So, the radio block can be released early by GSM after paging reception to be used by UMTS LTE. That improves the UMTS LTE throughput performance.

The solution according to some embodiments uses an improved method for CCCH decoding by training the UE with fixed known bits.

The solution according to some embodiments enables effective radio utilization.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described that provide efficient allocation of the transceiver for paging signal reception in one network (according to a second radio access technology) during communication in another network (according to a first radio access technology). These embodiments are particularly beneficial when a single radio transceiver is to be used for communication in both networks.

According to some embodiments, the efficient allocation is achieved by allocating a number of time periods (during communication in the other network) to reception of the paging signal, wherein the number is dynamically variable based on a result of a decoding of at least one previous paging signal reception.

UMTS LTE and GSM will be used in the following as a non-limiting example of the first and second radio access technology, respectively. It should be noted that embodiments may be equally applicable to other combinations of first and second radio access technologies, where paging signals of the second radio access technology need to be received during communication in accordance with the first radio access technology.

In some embodiments, a wireless communication device is configured to keep statistics of how many GSM bursts are needed for successful decoding of the paging signal and uses this knowledge to provide an assumption for reception of a following GSM paging signal.

The statistics may, for example, comprise the number of GSM bursts needed for successful decoding filtered over time, or an average (taken over a time window) number of GSM bursts needed for successful decoding of a block.

The number may be set to equal the number of GSM bursts needed for successful decoding (e.g. filtered or averaged) of a block.

If a decoding fails, the wireless communication device may be configured to revert to receiving all (4) bursts until successful decoding based on fewer (less than 4) bursts is achieved.

The latter may be particularly beneficial when the network signaling includes resending of non-acknowledged paging messages.

Another reason why the network signaling includes resending of non-acknowledged paging messages may be beneficial is since the UE may be in cell reselection (not listening to any base station) when a paging message is sent for the first time.

Application of some embodiments applies puncturing of the UMTS LTE communication to receive GSM paging. A decrease of the average time the radio block is used for reception of GSM paging is achieved according to some embodiments. Thus, the amount of UMTS LTE communication that needs to be punctures is decreased according to some embodiments, which may lead to higher UMTS LTE data throughput and/or better key performance indicators (KPI).

Figure 1:
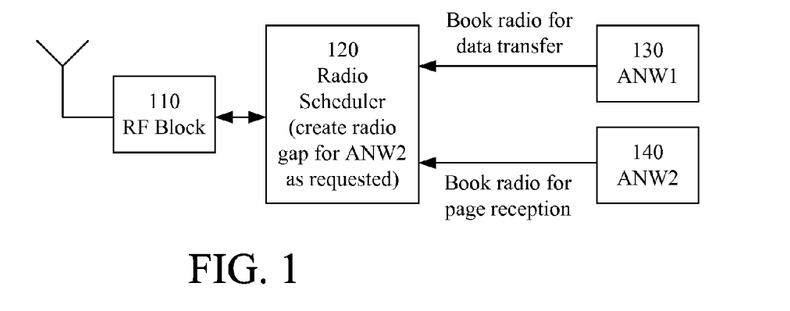
FIG. 1 is a block diagram illustrating an example arrangement according to some embodiments.

FIG. 1 illustrates an example arrangement for a wireless communication device according to some embodiments. The arrangement comprises a radio frequency (RF) block (or radio block, or radio access transceiver) 110 which is used to communicate alternatingly in accordance with a first radio access technology (e.g. UMTS LTE) and in accordance with a second radio access technology (e.g. GSM).

A first processing arrangement is provided for the first radio access technology (first access network unit—ANW1) 130 and a second processing arrangement is provided for the second radio access technology (second access network unit—ANW2) 140.

Since the RF block 110 is shared between the first and second processing arrangements 130 and 140, a radio scheduler 120 is provided to, for example, create a radio gap in communication according to the first radio access technology so that the second processing unit 140 may utilize the RF block 110 for paging reception. A radio gap in this context may be defined as an interruption in the use of the RF block 110 for communication (reception and/or transmission) according to the first radio access technology. Such an interruption makes the RF block 110 available for communication (reception and/or transmission) according to the second radio access technology (e.g. reception of paging signals such as, for example, a GSM paging burst).

Each of the first and second processing arrangements 130, 140 may be adapted to send requests to the radio scheduler 120 for booking the radio block for data transfer.

Figure 3:
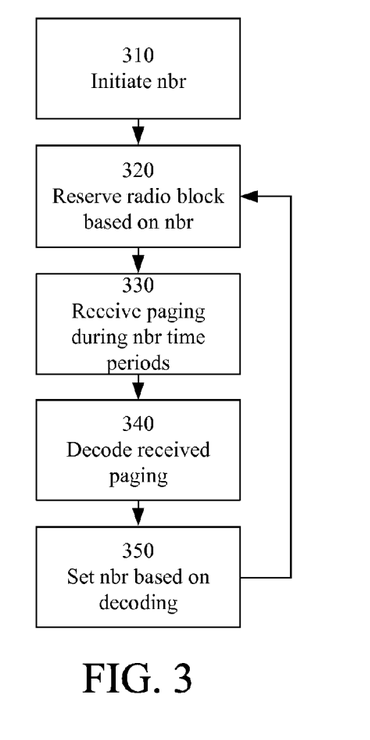
FIG. 3 is a flowchart illustrating example method steps according to some embodiments.
Figure 4:
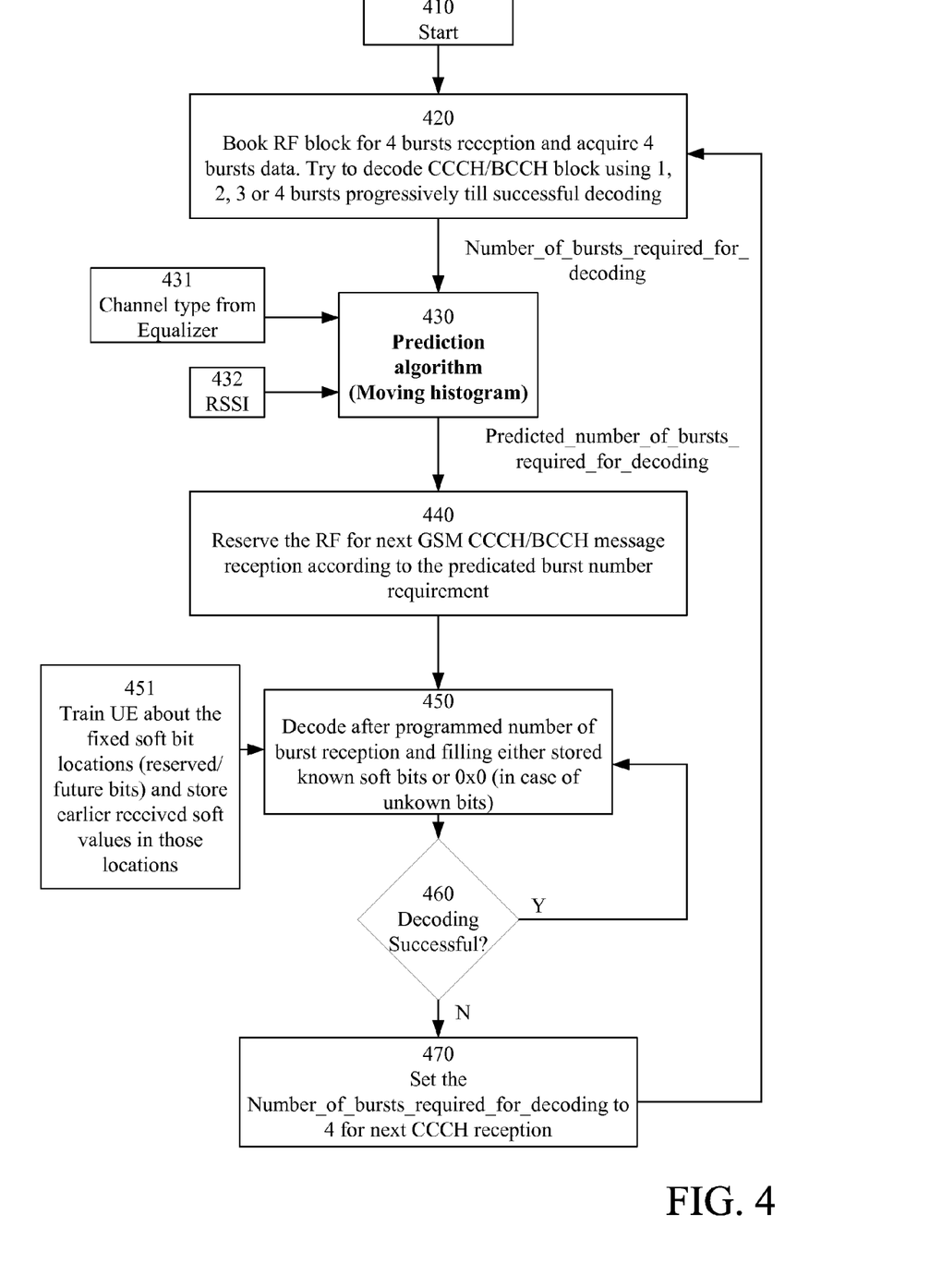
FIG. 4 is a flowchart illustrating example method steps according to some embodiments.

The arrangement in FIG. 1 may comprise a controller adapted to cause execution of method steps according to, for example any of the FIGS. 3 and 4. The controller may or may not be integral to the radio scheduler 120, or it may or may not be integral to the second processing block 140. In some embodiments, the controller is split into to or more units and is partly comprised in the radio scheduler 120 and partly comprised in the second processing block 140.

In some embodiments, the arrangement may further comprise a memory (e.g. a register, a memory unit, or similar) adapted to store the number of time periods that is to be used for allocation of reception of the next paging signal. The memory may or may not be integral to the radio scheduler 120, or it may or may not be integral to the second processing block 140.

Figure 2:
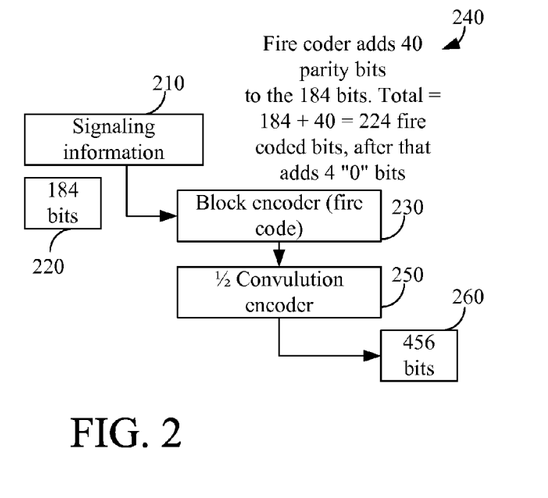
FIG. 2 is a schematic drawing illustrating GSM CCCH and BCCH block encoding.

FIG. 2 is a schematic drawing illustrating GSM CCCH and BCCH block encoding, where the resulting 456 bits (illustrated by 260) are sent in 4 bursts of 114 bits each.

The information (illustrated by 210) to be transmitted in the GSM CCCH/BCCH block (signaling information) typically consists of 184 bits (illustrated by 220). The 184 information bits are input to a block encoder (applying a fire code, illustrated by 230) which adds 40 parity bits to the 184 bits, resulting in 224 bits (illustrated by 240). Four bits with value "0" are added (also illustrated by 240) for application of a rate ½ convolutional encoder (illustrated by 250), which results in a total of 456 bits (illustrated by 260) to be transmitted as a GSM CCCH/BCCH block.

A GSM CCCH/BCCH block may be used as a paging block in GSM. A paging block may be sent in four paging bursts, each in a respective time period. Some GSM systems may apply sending less than four paging bursts for each paging block.

It may be possible to decode a paging block using only some of the sent paging bursts as the transmitted data is heavily encoded (e.g. ½ rate). For example, it may be possible to decode a paging block using only one, two or three paging bursts. This may, for example, depend on current radio conditions, signal strength, interference, etc.

FIG. 3 illustrates example method steps according to some embodiments. The method of FIG. 3 may, for example be performed by the controller mentioned in connection with FIG. 1 and/or by the arrangement that will be described later in connection with FIG. 5.

The method of FIG. 3 is particularly useful in a wireless communication device adapted to communicate using a radio access transceiver alternatingly in accordance with a first radio access technology and in accordance with a second radio access technology.

The method starts in step 310 where a value or number "nbr" of time periods is initiated. The value "nbr" may be initiated to a maximum value. In the example where the second radio access technology is GSM, step 310 may typically comprise initiating nbr to 4.

The method comprises allocating a number (nbr) of time periods (wherein each time period may, for example, correspond to a time period required to receive a burst of a GSM paging block) during communication in accordance with the first radio access technology to reception of a paging signal of the second radio access technology, wherein the number (nbr) is dynamically variable based on a result of a decoding of at least one previous paging signal of the second radio access technology.

In step 320, the radio block (e.g. 110, 510) is reserved for the second radio access technology during a time corresponding to nbr time periods. Thereby, the number (nbr) of time periods is allocated to reception of a paging signal of the second radio access technology. The reserved time corresponding to the nbr of time periods may be a continuous time (i.e. the time periods being consecutively concatenated) or a fragmented time (i.e. two or more of the time periods being separated by use of the radio transceiver for communication according to the first radio access technology).

In step 330, the paging signal is received during the allocated number (nbr) of time periods and in step 340 the received paging signal is decoded.

The decoding in step 340 is performed according to any suitable decoding technique for the second radio access technology.

The decoding of step 340 may (if nbr is less than the maximum value, i.e. 4 for GSM) comprise padding of zero values or other known/trained values as will be described later in connection to FIG. 4.

In some embodiments, the decoding always comprises trying decoding based on 1 time period (burst), and if that fails based on 2 time periods, and so until a successful decoding is achieved or until decoding has failed while the received number (nbr) of time periods were been utilized (progressive decoding trial).

In some embodiments, the above procedure is only applied if nbr has its maximum possible value (4 for GSM).

In some embodiments, the above procedure is only applied if nbr was set to its maximum possible value (4 for GSM) as an initial value or because the previous decoding failed.

In step 350, a subsequent number is set (typically by updating the number "nbr") based on a result of the decoding, and the method returns to step 320 for reception of a (repeated or other) paging signal, possibly after a new reservation of the radio block, if applicable.

In some embodiments, step 350 comprises setting nbr to its maximum possible value (4 for GSM) if the decoding in step 340 failed.

In some embodiments, step 350 comprises setting nbr to the number of time periods required for successful decoding in step 340. This may be applied for each completion of step 340 or only if progressive decoding trial was used in step 340.

In some embodiments, the nbr set in 350 may be subjected to any suitable filtering process before it is applied in step 320. Filtering may be applied always or only if nbr was not set to its maximum possible value (4 for GSM) since the decoding in step 340 failed (if the decoding in step 340 failed, the filter output may be forced to the maximum possible value of nbr and the filter content may be reset). Filtering coefficients may be based on received signal strength and/or on a channel type (e.g. as valid when the latest paging signal was received in step 330).

Various combinations of the above embodiments for step 350 are also envisioned.

FIG. 4 illustrates example method steps according to some embodiments. The method of FIG. 4 may, for example be performed by the controller mentioned in connection with FIG. 1 and/or by the arrangement that will be described later in connection with FIG. 5. The method of FIG. 4 may, for example, be seen as a more detailed example of the method described in connection to FIG. 3.

The method of FIG. 4 is particularly useful in a wireless communication device adapted to communicate using a radio access transceiver (compare with 110 of FIG. 1) alternatingly in accordance with a first radio access technology and in accordance with a second radio access technology.

The method of FIG. 4 illustrates a situation where the second radio access technology is GSM. Hence, a paging block typically comprises four bursts (the maximum value is four) and may be transmitted as a CCCH/BCCH block.

When the method is started (step 410, compare with step 301 of FIG. 3) the number of burst to receive is initiated to four.

In step 420, an RF block (compare with 110 of FIG. 1) is booked for reception of four bursts (compare with step 320 of FIG. 3). Thus, a number of four time periods are allocated (reserved) for reception of a paging signal. Then, the four bursts of data comprising a CCCH/BCCH block are acquired (received, compare with step 330 of FIG. 3), and decoding of the CCCH/BCCH block (compare with step 340 of FIG. 3) is tried progressively based on 1, 2, 3, and 4 of the bursts until successful decoding is achieved. The number of bursts required for decoding is set to the lowest number of bursts for which successful decoding was achieved. If no successful decoding was achieved in step 420, the number of bursts required for decoding may be set to four.

The number of bursts required for decoding is then input to a prediction algorithm 430 (compare with step 350 of FIG. 3), where a predicted number of bursts required for decoding is determined based on the number of bursts required for decoding.

The prediction algorithm may, for example, be implemented as a filter for the number of bursts required for decoding. Filter coefficients may, for example, be varied based on current radio conditions (e.g. a current channel type determined by an equalizer as illustrated by 431 and/or a current received signal strength indicator—RSSI—as illustrated by 432). For example, if current received signal strength indicator is high the filter may be configured with a high time constant (slow reaction to changes) while if current received signal strength indicator is low the filer may be configured with a low time constant (fast reaction to changes) and/or if current channel type is a fast fading channel the filter may be configured with a low time constant (fast reaction to changes) while if current channel type is slowly fading the filer may be configured with a high time constant (slow reaction to changes).

In step 440, the RF block (compare with 110 of FIG. 1) is reserved (booked) for reception of the next GSM CCCH/BCCH message in a number of bursts that correspond to the predicted number of bursts required for decoding as determined in step 430 (compare with step 320 of FIG. 3) and the bursts of data are received (compare with step 330 of FIG. 3).

Decoding is performed in step 450 after reception of the number of bursts (compare with step 340 of FIG. 3). If the number of bursts were less than four, the bit positions of the CCCH/BCCH block that lack received data may be filled by zeros or by stored information. The stored information may, for example, comprise (soft) bit values of fixed locations where the bit value is predetermined or similar, as illustrated by 451.

If the decoding in step 450 is successful (Y-path out from step 460), the method returns to step 450 and paging reception continues to apply the same number of bursts required for decoding as before.

If the decoding in step 450 is not successful (N-path out from step 460), the number of bursts required for decoding is set to four in step 470 and the method returns to step 420 for a new evaluation according to progressive decoding.

The determination regarding whether or not the decoding is successful may be achieved in any suitable way. For example, a cyclic redundancy check may be applied.

By means of steps 420, 430, 460 and 470, the number of bursts required for decoding is dynamically variable based on a result of the decoding of paging signals.

Figure 5:
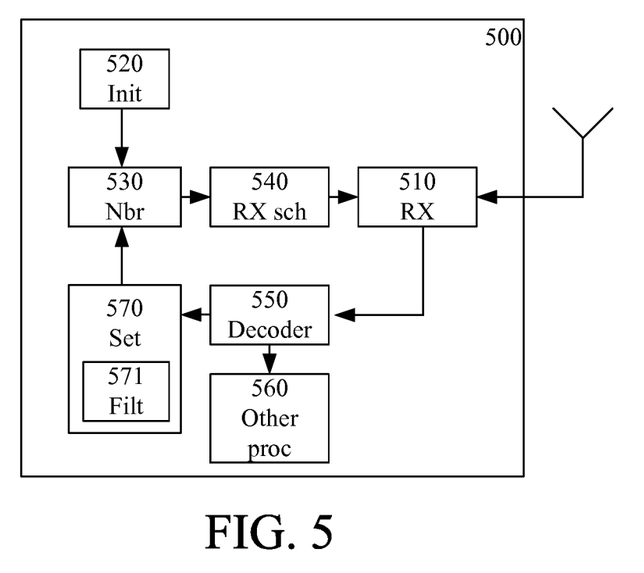
FIG. 5 is a block diagram illustrating an example arrangement according to some embodiments.

FIG. 5 schematically illustrates an example arrangement 500 according to some embodiments.

The arrangement 500 comprises a receiver (RX) 510 which may be part of a radio access transceiver (radio block, compare with 110 of FIG. 1) which is adapted to receive a paging signal (compare with step 330 of FIG. 3).

The arrangement 500 also comprises a decoder 550 (e.g. part of the second processing arrangement 140 of FIG. 1) which is adapted to decode the paging signal (compare with step 340 of FIG. 3). The decoded paging signal may be further processed by other processing units 560.

The arrangement 500 also comprises a setting unit (Set) 570 (e.g. part of the second processing arrangement 140 or the radio scheduler 120 of FIG. 1) which is adapted to set nbr (which is kept or stored in a memory or nbr unit 530) based on the decoding of the paging signal (compare with step 350 of FIG. 3). For this purpose, the setting unit may comprise (or be otherwise associated with) a filter 571.

The arrangement 500 also comprises an initiating unit (Init) 520 (e.g. part of the second processing arrangement 140 or the radio scheduler 120 of FIG. 1) which is adapted to set nbr to an initial value (compare with step 310 of FIG. 3). The initiating unit 520 may or may not be implemented together with the setting unit 570 as a single unit.

The arrangement 500 also comprises a radio scheduler (RX sch) 540 (compare with the radio scheduler 120 of FIG. 1) which is adapted to set reserve (allocate) the receiver 510 for paging reception based on nbr (compare with step 320 of FIG. 3). The nbr unit 530 may or may not be included in the radio scheduler 540.

In some embodiments, one or more of the initiating unit 520, the nbr unit 530, the radio scheduler 540 and the setting unit 570 may be implemented as comprised in a controller.

The example arrangement 500 may, for example, be adapted to execute one or more of the method steps as described in connection to any of FIG. 3 or 4. Alternatively or additionally, the example arrangement 500 may, for example, be implemented as part of the example arrangement described in connection to FIG. 1. Yet alternatively or additionally, the example arrangement 500 may, for example, be implemented in a wireless communication device. For example, block 110 of FIG. 1 may be identical with or similar to block 510 of the arrangement 500, and block 120 of FIG. 1 may be identical with or similar to block 540 of the arrangement 500. Block 140 of FIG. 1 may comprise one or more of blocks 550, 560, 570, 530 and 520 of the arrangement 500. Block 120 of FIG. 1 may also comprise one or more of blocks 570, 530 and 520 of the arrangement 500.

An illustrative example embodiment will be described in the following in terms of a method for a device of parallel GSM page reception while connected to UMTS LTE connected. The method utilizes prediction of the GSM paging of the number of bursts per block needed for successful decoding, which typically leads to an average of lesser number of bursts per block (and decreased UMTS LTE data throughput loss) than the prior art.

Assuming that ANW1 is UMTS LTE and ANW2 is GSM, FIG. 1 illustrates an example of GSM and UMTS LTE radio sharing, where fast GSM page reading while data transfer is on-going in UMTS LTE is desirable. As will be seen in the following GSM books only N (less than or equal to 4) number of bursts (instead of always 4 bursts) for the next CCCH/BCCH block reception.

This example is a solution to reduce the UMTS LTE throughput loss by dynamically predicting (ahead of time) the number of bursts in blocks of a Common Control CHannel (CCCH) and/or Broadcast Control CHannel (BCCH) (herein denoted CCCH/BCCH or CCCH(PCH)/BCCH)) required in order to decode the content of the signaling/control channel (BCCH resp. CCCH). The BCCH comprises Paging Channel (PCH), Access Grant Channel (AGCH) in the downlink and Random Access Channel (RACH) in the uplink. The UE needs to receive both the paging channel (e.g. PCH which is part of the CCCH) for paging reception and a broadcast channel (e.g. BCCH) periodically for cell-reselection. This needs to be done in parallel to listening on a paging from a legacy network (e.g. GSM), while connected to another RAT (e.g. LTE or WCDMA).

Typically, CCCH (PCH) and BCCH messages are heavily encoded (in the downlink, the PCH and AGCH are typically 40 bit Fire encoded and then ½ rate convolutional encoded) and transmitted over four bursts spread over four TDMA (Time Division Multiple Access) frames (4*4.615 ms). So, for ideal reception, the receiver receives 4 bursts of data over ~20 ms and then triggers the CCCH decoding. This process blocks the radio block (RF) for 20 ms at a stretch due to GSM usage, which typically causes UMTS LTE throughput loss. One objective for this example is to reduce the number of bursts required for CCCH/BCCH decoding dynamically based on the previous history of decoding and channel conditions, so that GSM can give back the radio block (RF) to UMTS LTE much earlier than in the prior art instead of hogging for ~20 ms.

Due to high coding rate, the decoder can typically decode these channels' data much earlier than after 4 bursts (e.g. after receiving 1, 2 or 3 bursts—see FIG. 2 which illustrates GSM CCCH/BCCH block encoding).

In this example, a prediction algorithm is used to decide dynamically how many bursts are required (at a minimum) to successfully decode a CCCH/BCCH block by using the past history (and possibly the channel conditions). Based on the prediction, the receiver blocks the radio block (RF) for GSM paging during the predicted number of bursts only, instead of booking radio time for all 4 bursts. Thus, GSM will typically be using the radio block (RF) for a shorter period of time (according to the time considered optimum for successful CCCH/BCCH decoding according to the prediction at that time).

Typically, one CCCH or BCCH block contains 184 soft bits (GMSK—Gaussian Minimum Shift Keying—symbols). In case of early stop reception (e.g. when the prediction indicates less than 4 bursts; the receiver will have lesser number of soft bits (e.g. soft bits from one or more of the 1st, 2nd and 3rd bursts as received). The remaining soft bits (corresponding to bits of not received bursts) may be filled with 0×0 values and thereafter the block may be fed to the channel decoder. As some of the bits/symbols (info bits) in Paging or Broadcast channel (PCH or BCCH) may be pre-known and do not change over time, those information bits may be encoded/interleaved and their positions over the bursts may be derived beforehand. Then, during the early decoding stage, those soft bits are filled with known/expected/pre-stored (trained from the earlier received data) values instead of 0×0 (e.g. instead of punctured bits). That may further improve the successful decoding rate; especially when 3rd or 4th burst data are not received at all.

A detailed logical flow of the method according to this example (a method for dynamic CCCH/BCCH burst number reception setting and decoding) may be illustrated by FIG. 4, which has been described earlier. Initially (after starting in step 410), the CCCH/BCCH bursts requirement for block decoding is set to 4 (since one CCCH/BCCH block is transmitted over 4 bursts as explained above), compare with step 310 of FIG. 3. So, the radio block (RF) will be booked for GSM CCCH reading for reception of 4 bursts (step 420, compare with steps 320, 330, 340 of FIG. 3). UMTS LTE will be scarifying around 20 ms time gap for GSM paging reception.

Even though all 4 bursts are received, decoding will proceed as follows (step 420):
  decoding will be tried with 1 burst (e.g. with 114 soft bits); if successful, then indicate Number_of_burst_required_for_decoding=1 to the prediction algorithm;
  else decoding will be tried with 2 bursts (e.g. with 2*114 soft bits); if successful, then indicate Number_of_burst_required_for_decoding=2 to the prediction algorithm;
  else decoding will be tried with 3 bursts (e.g. with 3*114 soft bits); if successful, then indicate Number_of_burst_required_for_decoding=3 to the prediction algorithm;
  else decoding will be tried with 4 bursts (e.g. with 4*114 soft bits); if successful, then indicate Number_of_burst_required_for_decoding=4 to the prediction algorithm;
  else (no successful decoding) directly set Number_of_burst_required_for_decoding=4 (compare with step 470).

The prediction algorithm block (step 430, compare with step 350 of FIG. 3) may receive one or more of the following inputs:
  Number_of_burst_required_for_decoding: May be 1, 2, 3 or 4, as indicated by the decoder—status block based on the number of burst used for successful decoding as above.
  Serving_GSM_cell_RSSI (432): Measured RSSI (Received Signal Strength Indicator) value of the serving cell.
  Channel_type (431; e.g. fading channel or non-fading channel): This input may be proved by the channel equalizer during the CCCH or BCCH burst equalization/demodulation.

The prediction algorithm (430) may try to create a histogram of the number of bursts needed for the decoding of the paging block considering the history of the last K paging blocks. This will typically be a moving histogram with a finite length.

The prediction algorithm (430) may also be implemented as a long term averaging filter implemented, for example, as follows:

The prediction algorithm has a long term averaging filter (wherein the filter length can be tuned empirically) which uses the below algorithm:
  Predicted_number_of_burst_required_for_decoding [k+1]=
  ($\alpha 1$*Predicted_number_of_burst_required_for_decoding [k]+$\alpha 2$*Number_of_burst_required_for_decoding [k]).

Predicted_number_of_burst_required_for_decoding [k+1] indicates the predicated number of bursts required to decode the (k+1)th CCCH block reception, e.g. the next incoming (future) CCCH block.

Number_of_burst_required_for_decoding [k] indicates the number of burst required to decode the kth (present) CCCH block reception.

Predicted_number_of_burst_required_for_decoding [k] indicates the long term value of the number of CCCH burst required in the past for CCCH decoding (this is the average past value). Alternatively, Number_of_burst_required_for_decoding [k−1] may be used instead of Predicted_number_of_burst_required_for_decoding [k].

The filter coefficients $\alpha 1$, $\alpha 2$ are the weights given to the past averaged required burst number for CCCH block decoding and present required burst number for CCCH block decoding, respectively.

The values of the coefficients $\alpha 1$, $\alpha 2$ values may be set based on the channel type and a signal strength value (e.g. RSSI). For example, if the channel type is a fading channel and/or if the RSSI is lower than a threshold, preference may be given to the old averaged value (relatively large $\alpha 1$) compared to present value (relatively small $\alpha 2$), else, more preference may be given to the present value (relatively large $\alpha 2$).

The value of the RSSI threshold may be decided empirically based on, for example, environmental and transmission conditions.

The RSSI threshold may be tuned towards a best judgment to consider when to go for, e.g., 2 burst decoding. For example, when the signal condition is good and the true RSSI computed at the baseband (typically the carrier-to-interference ratio, C-I) is higher than a threshold value, 2 burst decoding may be enough to decode the CCCH burst. A typical example of a C-I threshold value suitable in this situation can be, for example, −80 dBm.

So, the prediction algorithm (step 430) outputs a prediction regarding the number of CCCH bursts required to do successful decoding for the next incoming CCCH block reception and decoding. The prediction output may not be an integer number, but will be mapped to one of the integer numbers 1, 2, 3 or 4 (e.g. the nearest one, or the nearest larger one).

Based on the output of the prediction algorithm, the radio block (RF) is reserved accordingly for GSM CCCH/BCCH reception (step 440, compare with step 320, 330 of FIG. 3). For example, if the prediction algorithm output is 2, then RF is booked for GSM paging reception for 2 bursts only (instead of 4 bursts as in prior art designs).

Since GSM (compare with block 140 of FIG. 1) is dynamically predicting and accordingly reducing the total number of bursts for reception over a CCCH/BCCH block, the receiver is enabled to quickly revert back and provide the radio block (RF) to UMTS LTE for data reception/transmission. This typically improves the UMTS LTE throughput performance.

As shown in FIG. 4, the algorithm will typically try to minimize the number of bursts required for decoding per CCCH block (see steps 450, 460, 470, compare with step

340 of FIG. 3). So it typically tries to move towards 1 or 2 or 3 bursts decoding. But if (at any time) the number of burst required was set to 1, 2 or 3 and the burst decoding fails (No-path out from step 460; e.g. CRC—Cyclic Redundancy Check—fails) then the number of burst required is set to 4 (step 470) for the next CCCH block decoding. This has a purpose to avoid repeated failing when/if the network sends a repeated paging message. Typically, if the wireless communication device (UE) does not respond quickly (as is the case when CCCH decoding fails) the network repeats the paging and the UE should preferably not miss that paging occasion. So, to enhance the performance for repeated paging, the number of burst required for decoding CCCH may be set to 4 whenever CCCH decoding fails (step 470).

The nbr used in connection with FIG. 3 may, in FIG. 4 correspond to Predicted number_of_burst_required_for_decoding in step 440 and to Number_of_burst_required_for_decoding in step 420.

In some embodiments, the receive diversity mode may be always enabled during the reception of the CCCH burst, since this provides around 2 dB extra decoding gain which increases the chances for successful decoding over 2 bursts in most of the cases.

To improve the decoding quality for early decoding (e.g. steps 420 and 450) one or more of the following methods two methods may be used:

Every time, after receiving the first burst (e.g. demodulation of 114 soft bits), the decoding is triggered by filling the remaining soft bits of that block with a value of 0×0 (similar to punctured value). In case of empty paging the same method is applied. If decoding of the first burst is not succeeded, then same is repeated after 2nd and 3rd burst reception by filling not received soft bits using 0×0.

If the UE is repeatedly reading the same control channel's data from a same cell or network, the UE may consider that some of the unused bits (or fixed, spare, future, reserved) in the message structure are not changed or are fixed always (step 451; see. e.g. (3GPP Technical Specification (TS) 44.006 V8.0.0 (2008-12), sections 5 and 8.4.2.3). Once the cell or network is changed, the UE again can train itself for those known bits by decoding the full message structure at the first time (step 451). Once the UE knows about the value of those bits after reading a specific channel block data for the first time, then it can assume that these bits for this type of control channel message will remain fixed as long as the UE is not moved to another cell or network or some specific reconfiguration happens.

Some bits like Command/Response can also be preknown, since they can be considered as fixed because the UE knows that it is going to receive the command via this message. So, the bit value sometimes becomes explicit according to the channel type the UE is going to receive. After decoding, it will be known where these encoded and interleaved bits positions will be (in which burst and which location). When 4 bursts in a paging block are read (e.g. step 420), the UE will store those soft bit values in the corresponding fixed pre-defined locations. Then, when early decoding happens, the UE will populate the known fixed locations with the stored soft values as received earlier.

So, either 0×0 or stored soft values (which the UE is trained to recognize) with respect to certain locations may be used to populate the paging block before decoding when less than 4 bursts are used.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a pager, a communicator, an electronic organizer, a smartphone, a computer, a notebook, a USB-stick, a plug-in card, an embedded drive, or a mobile gaming device.

Figure 6:
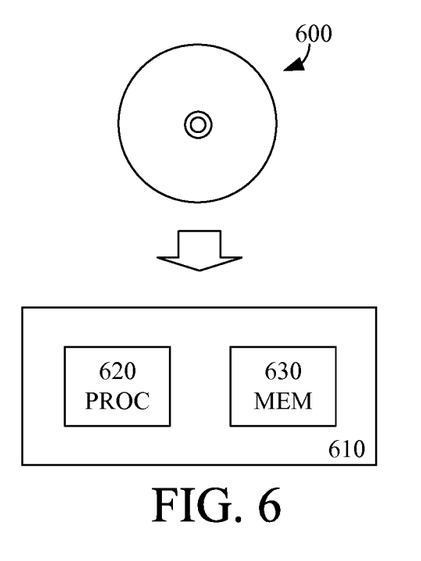
FIG. 6 is a schematic drawing illustrating a computer readable medium according to some embodiments.

According to some embodiments, a computer program product comprises a computer readable medium such as, for example, a diskette or a CD-ROM as illustrated by the CD-ROM 600 of FIG. 6. The computer readable medium may have stored thereon a computer program comprising program instructions. The computer program may be loadable into a data-processing unit (PROC) 620, which may, for example, be comprised in a mobile terminal 610. When loaded into the data-processing unit, the computer program may be stored in a memory (MEM) 630 associated with or integral to the data-processing unit. According to some embodiments, the computer program may, when loaded into and run by the data-processing unit, cause the data-processing unit to execute method steps according to, for example, the methods shown in any of the FIG. 3 or 4.

Reference has been made herein to various embodiments. However, a person skilled in the art would recognize numerous variations to the described embodiments. For example, the method embodiments described herein describes example methods through method steps being performed in a certain order. However, it is recognized that these sequences of events may take place in another order without departing from the conceptual idea of the embodiments. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit.

Hence, it should be understood that the details of the described embodiments are merely for illustrative purpose and by no means limiting.

The invention claimed is:

1. A method of a wireless communication device adapted to communicate using a radio access transceiver alternatingly in accordance with a first radio access technology and in accordance with a second radio access technology, the method comprising:

allocating a number of time periods during communication in accordance with the first radio access technology to reception of a paging signal of the second radio access technology, wherein the number is dynamically variable based on a result of a decoding of at least one previous paging signal of the second radio access technology;

receiving the paging signal of the second radio access technology during the allocated number of time periods;

decoding the received paging signal;

setting a subsequent number of time periods for allocation to reception of a subsequent paging signal based on a result of the decoding of the received paging signal;

allocating the subsequent number of time periods during communication in accordance with the first radio access technology to reception of the subsequent paging signal of the second radio access technology;

receiving the subsequent paging signal of the second radio access technology during the allocated subsequent number of time periods;

decoding the received subsequent paging signal; and setting a yet subsequent number of time periods for allocation to reception of a yet subsequent paging signal based on a result of the decoding of the received subsequent paging signal, where at least one number of time periods for allocation to reception of the paging signal is set based on at least one respective previous number of time periods required for successful decoding of the at least one previous paging signal.

2. The method of claim 1 wherein the at least one number of time periods for allocation to reception of the paging signal is set to an output value of a filter having the at least one respective previous number of time periods as an input.

3. The method of claim 2 wherein one or more coefficients of the filter are based on one or more of a received signal strength of the at least one previous paging signal and a channel type applicable during reception of the at least one previous paging signal.

4. The method of claim 1 wherein the first radio access technology is a radio access technology in accordance with the Universal Mobile Telecommunication Standard, Long Term Evolution—UMTS LTE—and the second radio access technology is a radio access technology in accordance with the Global System for Mobile communications—GSM.

5. The method of claim 4 wherein each time period corresponds to a time period required to receive a burst of a GSM paging block.

6. The method of claim 4 wherein the number is an integer value between one and four.

7. The method of claim 6 further comprising initiating the number to four.

8. The method of claim 6 further comprising setting the number to four if an immediately previous paging signal was not successfully decoded.

9. An arrangement for a wireless communication device adapted to communicate using a radio access transceiver alternatingly in accordance with a first radio access technology and in accordance with a second radio access technology, the arrangement comprising:

a radio scheduler adapted to allocate a number of time periods during communication in accordance with the first radio access technology to reception of a paging signal of the second radio access technology, wherein the number is dynamically variable based on a result of a decoding of at least one previous paging signal of the second radio access technology;

the radio access transceiver adapted to receive the paging signal of the second radio access technology during the allocated number of time periods;

a decoder adapted to decode the received paging signal;

a number setting unit adapted to set a subsequent number of time periods for allocation to reception of a subsequent paging signal based on a result of the decoding of the received paging signal;

the radio scheduler is further adapted to allocate the subsequent number of time periods during communication in accordance with the first radio access technology to reception of the subsequent paging signal of the second radio access technology;

the radio transceiver is further adapted to receive the subsequent paging signal of the second radio access technology during the allocated subsequent number of time periods;

the decoder is further adapted to decode the received subsequent paging signal; and the number setting unit is further adapted to set a yet subsequent number of time periods for allocation to reception of a yet subsequent paging signal based on a result of the decoding of the received subsequent paging signal, where at least one number of time periods for allocation to reception of the paging signal is set based on at least one respective previous number of time periods required for successful decoding of the at least one previous paging signal.

10. The arrangement of claim 9 further comprising a memory adapted to store the number for allocation of reception of the paging signal.

11. The arrangement of claim 9 wherein the number setting unit is adapted to set the number for allocation to reception of the paging signal based on the at least one respective previous number of time periods required for successful decoding of the at least one previous paging signal.

12. The arrangement of claim 11 further comprising a filter having the at least one respective previous number of time periods as an input, and wherein the number setting unit is adapted to set the number for allocation to reception of the paging signal to an output value of the filter.

13. The arrangement of claim 12 wherein one or more coefficients of the filter are based on one or more of a received signal strength of the at least one previous paging signal and a channel type applicable during reception of the at least one previous paging signal.

14. The arrangement of claim 9 wherein the first radio access technology is a radio access technology in accordance with the Universal Mobile Telecommunication Standard, Long Term Evolution—UMTS LTE—and the second radio access technology is a radio access technology in accordance with the Global System for Mobile communications—GSM.

15. The arrangement of claim 14 wherein each time period corresponds to a time period required to receive a burst of a GSM paging block.

16. The arrangement of claim 14 wherein the number is an integer value between one and four.

17. The arrangement of claim 16 further comprising a number initiating unit adapted to initiate the number to four.

18. The arrangement of claim 16 wherein the number setting unit is further adapted to set the number to four if an immediately previous paging signal was not successfully decoded.

* * * * *